(12) United States Patent  
Ogawa et al.

(10) Patent No.: US 7,707,376 B2
(45) Date of Patent: Apr. 27, 2010

(54) VERIFYING THE VALIDITY OF DATA SAVED AT POWER DOWN BY COMPARING THE TIME OF SAVE TO TIME OF POWER-OFF UPON START UP

(75) Inventors: Tomoya Ogawa, Hachioji (JP); Tomohiro Suzuki, Nishitokyo (JP); Yuji Tamura, Hachioji (JP); Tetsuya Ishikawa, Hachioji (JP); Hiroyasu Nishimura, Hachioji (JP); Fumikage Uchida, Asaka (JP); Nao Moromizato, Hino (JP); Munetoshi Eguchi, Hachioji (JP); Kenji Okuyama, Yokohama (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 378 days.

(21) Appl. No.: 11/866,641

(22) Filed: Oct. 3, 2007

(65) Prior Publication Data

US 2008/0086586 A1 Apr. 10, 2008

(30) Foreign Application Priority Data

Oct. 6, 2006 (JP) ............................. 2006-275692

(51) Int. Cl.
*G06F 11/07* (2006.01)
(52) U.S. Cl. ................ 711/162; 711/161; 711/E12.103; 714/1; 714/15
(58) Field of Classification Search ................. 711/161, 711/162; 714/1, 15
See application file for complete search history.

(56) References Cited

U.S. PATENT DOCUMENTS

| 6,336,174 | B1 * | 1/2002 | Li et al. ........................ 711/162 |
| 7,415,586 | B2 * | 8/2008 | Mimatsu et al. .............. 711/162 |
| 7,516,267 | B2 * | 4/2009 | Coulson et al. .............. 711/103 |
| 2005/0132150 | A1 * | 6/2005 | Jewell et al. ................. 711/154 |

* cited by examiner

*Primary Examiner*—David L Robertson
*Assistant Examiner*—TJ Bansal
(74) *Attorney, Agent, or Firm*—Finnegan, Henderson, Farabow, Garrett and Dunner, L.L.P.

(57) ABSTRACT

An information processing apparatus including: a nonvolatile memory; a volatile system memory in which predetermined data stored in the nonvolatile memory is developed; a control section to save the predetermined data stored in the system memory in the nonvolatile memory when a start of power-off operation is detected; and a storage section that stores a first timing information representing a time point of terminating the operation of saving the predetermined data in the nonvolatile memory, and a second timing information representing a power-off time point, wherein the control section compares the first timing information stored in the storage section with the second timing information, subsequent to the next operation of turning on of the power.

15 Claims, 12 Drawing Sheets

VERIFYING THE VALIDITY OF DATA SAVED AT POWER DOWN BY COMPARING THE TIME OF SAVE TO TIME OF POWER-OFF UPON START UP

RELATED APPLICATION

This application is based on Japanese Patent Application No. 2006-275692 filed on Oct. 6, 2006 in Japanese Patent Office, the entire content of which is hereby incorporated by reference.

FIELD OF THE INVENTION

The present invention relates to an information processing apparatus and a method for saving data wherein predetermined data is saved from a volatile memory to a nonvolatile memory when powered is turned off.

BACKGROUND OF THE INVENTION

In an information processing apparatus wherein the model-specific data must be preserved even after the information processing apparatus is powered off, the data stored in a nonvolatile memory 81 is developed in a system memory 82 which can be accessed faster than this nonvolatile memory 81 when powered on, as shown in FIG. 9. Then the processor 83 accesses the data on the system memory 82, whereby deterioration of the nonvolatile memory 81 due to frequent access is avoided and the system operation speed is increased.

In such an information processing apparatus, the data having been developed from the nonvolatile memory 81 into the system memory 82 may be changed to assume a different value during the operation. When power is turned off, the data in the system memory 82 must be saved into the nonvolatile memory 81, as shown in FIG. 10.

In this case, when the start of power-off operation has been detected according to a reduction in voltage (T1), the trigger signal TS representing the result of this detection is generated, and the saving (SV) of the corresponding data into the nonvolatile memory starts in response to this trigger signal TS, as shown in FIG. 11. Under the normal working condition, this saving operation (SV) can be terminated with sufficient lead time before the power is turned off (Toff), even if started after the occurrence of the trigger signal TS.

However, as shown in FIG. 12, when operation is made under the severe power conditions (e.g., instability and reduction of voltage), the time duration (Td) between occurrence of the trigger signal TS (T1) and actual turning off of the power (Toff) is shorter than expected. This may result in failure of data saving (the data having failed in the saving operation is indicated by "E" in the drawing). To avoid this, it is a common practice to preset the amount of data to be saved from the system memory to the nonvolatile memory when powered off, assuming a possible operation under poor power conditions.

In the meantime, a proposal has been made of a technique of verifying whether or not the writing of data into the nonvolatile memory has terminated incomplete in the middle of operation in the event of unexpected turning off of the power. For example, a memory area is divided into blocks, and a writing termination flag corresponding to each block is set, whereby it is possible to determine the blocks wherein writing operation has terminated successfully (e.g., Japanese Unexamined Patent Application Publication No. H10-240629).

As described above, when setting the amount of data to be saved from the system memory to the nonvolatile memory when power is turned off, a possible operation under poor power conditions is taken into account, and this amount is set at a rather smaller level. Under favorable power conditions, the amount of the data developed from the nonvolatile memory to the system memory is preferably maximized so that the frequency of access to the nonvolatile memory is minimized.

However, in the conventional art disclosed in the Japanese Unexamined Patent Application Publication No. H10-240629, it is possible to verify whether or not the writing of data in the nonvolatile memory has terminated incomplete in the middle of operation. If the saving of the data has terminated before the power is turned off, this technique fails to provide information showing the possible time allowance from the termination of saving operation to the power-off operation and information for the possibility of increasing the amount of data to be saved.

One object of the present invention is to solve these problems and to provide an information processing apparatus capable of verifying the reliability of the data having been saved to the nonvolatile memory when powered off, and providing information for changing the amount of data to be saved in the nonvolatile memory.

SUMMARY

According to one aspect of the present invention, there is provided an information processing apparatus comprising: a nonvolatile memory; a volatile system memory in which predetermined data stored in the nonvolatile memory is developed; a control section to save the predetermined data stored in the system memory in the nonvolatile memory when a start of power-off operation is detected; and a storage section that stores a first timing information representing a time point of terminating the operation of saving the predetermined data in the nonvolatile memory, and a second timing signal representing a power-off time point, wherein the control section compares the first timing information stored in the storage section with the second timing information, subsequent to the next operation of turning on of the power.

According to another aspect of the present invention, there is provided a method for saving data in a nonvolatile memory comprising: saving predetermined data stored in a volatile memory in the nonvolatile memory when detecting a start of power-off operation; storing a first timing information representing a time point of terminating the operation of saving the predetermined data in the nonvolatile memory, and a second timing information representing a power-off time point; and comparing the stored first timing information with the stored second timing information, subsequent to the next operation of turning on of the power.

BRIEF DESCRIPTION OF THE DRAWINGS

FIG. 9 is an explanatory diagram showing that the predetermined data is developed from the nonvolatile memory to the system memory when powered on;

DETAILED DESCRIPTION OF THE PREFERRED EMBODIMENTS

Figure 1:
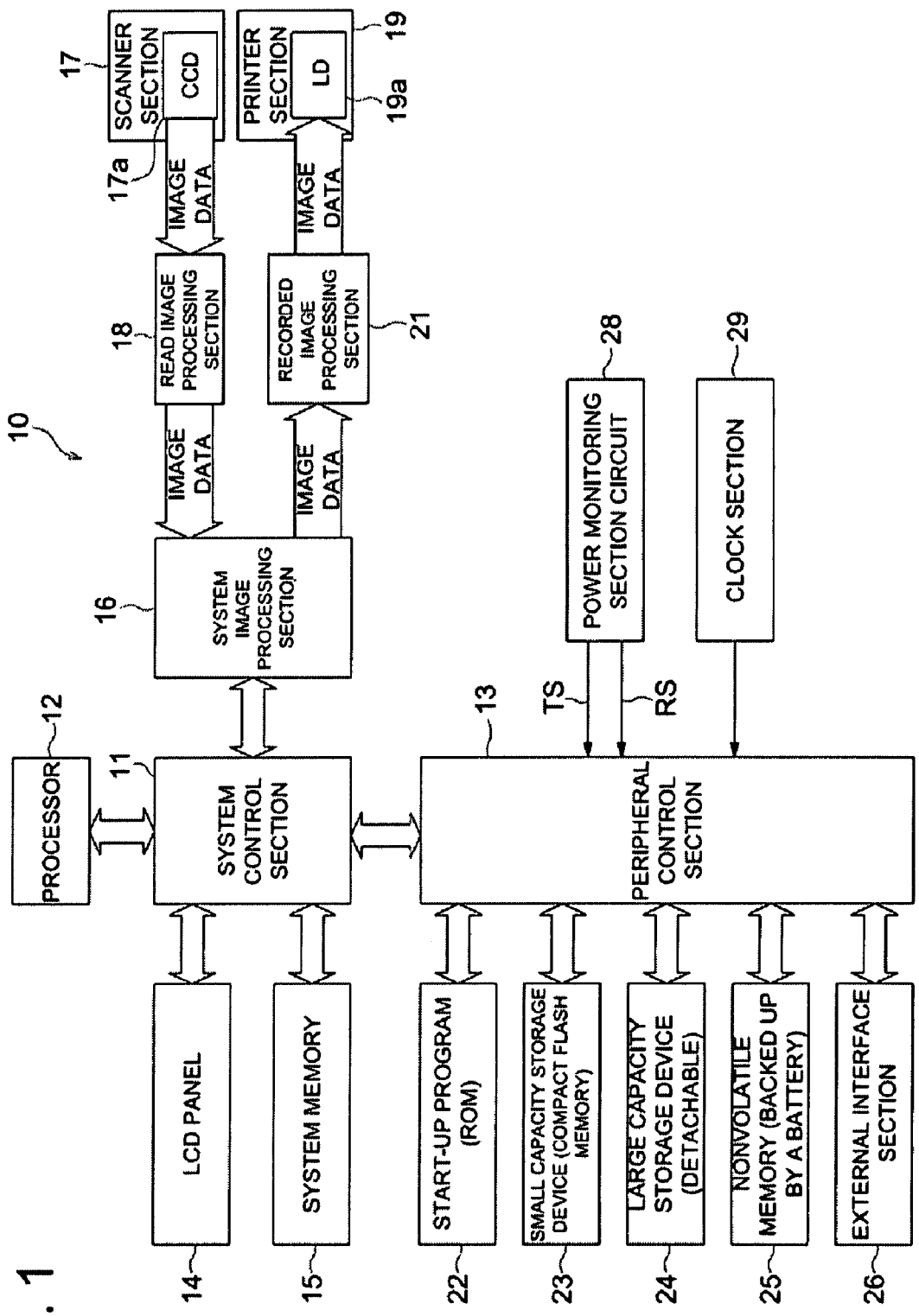
FIG. 1 is a block diagram representing the structure of an image processing apparatus as an embodiment of the present invention.

Referring to drawings, the following describes the embodiments of the present invention:

FIG. 1 shows the structure of the image processing apparatus 10 as an example of an information processing apparatus of the present invention. The image processing apparatus 10 is an apparatus equipped with a copying function that reads a document image, creates a reproduced image on a recording sheet and outputs the sheet, and includes a control section having: a system control section 11 for controlling the operation of the entire system; a processor 12 for performing the computation function; and a peripheral control section 13 for controlling various forms of peripheral function.

The system control section 11 is connected to a LCD (Liquid Crystal Display) panel 14, system memory 15, system image processing section 16 in addition to the processor 12 and peripheral control section 13. The LCD panel 14 is used to receive various forms of operations from the user, and to display on various forms of operation screen and guide screens. The system memory 15 is used to store the program executed by the processor 12. It is a work memory used when a program is executed by the processor 12. It is a volatile memory also used to store image data. It uses a semiconductor memory characterized by higher in speed than the nonvolatile memory 25 (to be described later).

The system image processing section 16 is connected a CCD (Charge Coupled Device) image sensor 17a via a read image processing section 18, wherein this image sensor 17a is a reading element of the scanner section 17 that reads a document image. It is also connected with the LD (Laser Diode) 19a of the laser exposure type printer section 19 via a recorded image processing section 21. In the document reading operation, the image data outputted from the CCD image sensor 17a is subjected to various forms of correction by a read image processing section 18, and is then inputted into the system image processing section 16. The image data is further subjected to various forms of processing by the system image processing section 16, and is temporarily stored in the system memory 15 through a system control section 11.

In the operation of outputting onto the recording sheet, the image data stored in the system memory 15 is read out by the system control section 11, and is inputted into the system image processing section 16. The image data is subjected to various forms of processing by the system image processing section 16, and is then outputted to the LD 19a through the recorded image processing section 21, whereby an image is formed on the recording sheet.

The peripheral control section 13 is connected with a ROM (Read Only Memory) 22 having a start-up program or the like stored in advance, small-capacity storage device 23, large-capacity storage device 24, nonvolatile memory 25 and external interface section 26. The small-capacity storage device 23 is used to store the control program and the programs of the general-purpose operating system. In this case, a flash memory is used as a small-capacity storage device 23. When the image processing apparatus 10 is started up, the processor 12 executes the start-up program in the ROM 22, whereby the program in the small-capacity storage device 23 is developed in the system memory 15, and the processor 12 operates according to this program. The large-capacity storage device 24 is made up of a hard disk apparatus, for example, and is used to store the image data.

The nonvolatile memory 25 retains the contents of memory even when power is turned off. The nonvolatile memory 25 stores predetermined data to be preserved even after power-off operation, such as various forms of parameters inherent to the apparatus. Further, the nonvolatile memory 25 stores the first timing information representing the saving operation termination time point wherein data is saved from the system memory 15 in the nonvolatile memory 25 when powered off, and second timing information representing the power-off time point. The processing of storing the first timing information and second timing information in the nonvolatile memory 25 is performed by the processor 12.

The external interface section 26 controls the communication with the external apparatus being connected. For example, the LAN (Local Area Network), USB (Universal Serial Bus), and IEEE 1394 (Institute of Electrical and Electronics Engineers 1394) are used for connection.

The power monitoring section circuit 28 monitors the power status of the image processing apparatus 10 (e.g., voltage status). Upon detection of the start of power-off operation, it outputs a trigger signal TS. It also outputs the reset signal RS denoting the power-off time point. In this case, the trigger signal TS is outputted when power voltage has been reduced to the level of the first voltage. The reset signal RS is outputted when the power voltage is further reduced to reach the level of the second voltage. For example, the second voltage is set to the minimum voltage level wherein the processor 12 or nonvolatile memory 25 can operate. The output status of the trigger signal TS and reset signal RS is reported to the processor 12 through the peripheral control section 13 and system control section 11. The clock section 29 counts the passage of time.

The processor 12 of the image processing apparatus 10 reads the predetermined data from the nonvolatile memory 2S when powered on and develops the data in the system memory 15. After that, for the predetermined data having developed from the nonvolatile memory 25 to system memory 15, access is made to the data on the system memory 15 so that the operation is performed. The predetermined data developed on the system memory 15 is referenced or rewritten by the processor 12 in response to the operation of the image processing apparatus 10. Further, the predetermined data is saved from the system memory 15 in the nonvolatile memory 25 when powered off. Hereafter, the data that is developed to the system memory 15 from the nonvolatile memory 25 and saved in the nonvolatile memory 25 when powered off is referred to as "develop-save data".

The develop-save data includes various forms of parameters inherent to the apparatus, the number of copies, enumerated data representing the frequency of using each function (FAX function, printing function, etc.) and information on the status of mounting an option, without the present invention being restricted thereto.

Figure 2:
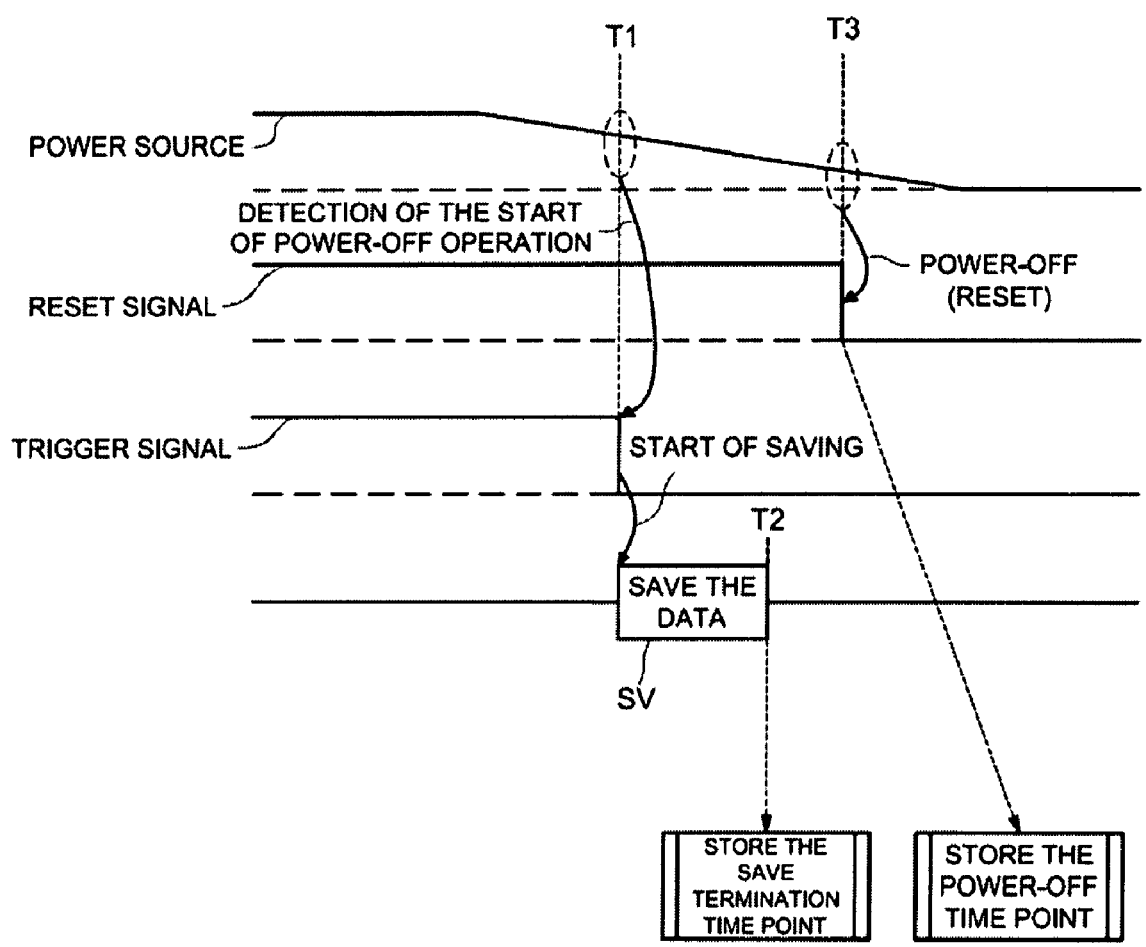
FIG. 2 is an explanatory diagram showing an example of the operation of saving the data to be developed or saved (when storing the power-off time point and saving termination time point)

FIG. 2 is an explanatory diagram showing the operation of saving the develop-save data of the present invention. The power monitoring section circuit 28 outputs the trigger signal TS (T1) upon detection of the power-off operation. Upon detection of the trigger signal TS, the processor 12 starts the process of saving the develop-save data of the system memory 15 in the nonvolatile memory 25 (SV). Upon termination of the operation of saving the develop-save data (T2), the processor 12 obtains the time point at this time (saving termination time point) from the clock section 29, and ensures that the first timing information indicating the saving termination time point is written and stored in the nonvolatile memory 25. Further, upon detection of the reset signal RS from the power monitoring section circuit 28 (T3), the processor 12 obtains the time point at this time (power-off time point) from the clock section 29, and ensures that the second timing information indicating the power-off time point is written and stored in the nonvolatile memory 25.

When power is on next time, the processor 12 reads the first timing information and second timing information from the nonvolatile memory 25, and compares the saving termination time point indicated on the first timing information, with the power-off time point indicated on the second timing information. Based on the result of this comparison, the processor 12 determines the validity of the develop-save data saved in the nonvolatile memory 25 at the time of the previous power-off operation.

To put it in greater details, when the saving termination time point comes before the power-off time point, it is determined that the saving of the develop-save data has terminated correctly and the develop-save data stored in the nonvolatile memory 25 is valid. By contrast, if the saving termination time point comes after power-off time point or the first timing information representing the saving termination time point is not stored in the nonvolatile memory 25 although the second timing information indicating the power-off time point is stored, saving of the develop-save data could not be performed in time. Accordingly, it is determined that the develop-save data stored in the nonvolatile memory 25 is not valid. If the power-off time point is the same as the saving termination time point, it can be determined that the stored data is valid, or, to be on the safe side, it can be determined that the stored data is not valid. Either of these handling arrangements can be determined as appropriate, in conformity to a particular field of the information processing apparatus, importance of the develop-save data or other factors, In the example, the saving termination time point as the first timing information and the power-off time point as the second timing information are stored in the nonvolatile memory 25. It is also possible to make such arrangements as to install a counter that starts counting of the predetermined clock signals when the trigger signal TS is outputted, so that the enumerated data of this counter is used as the first timing information and second timing information.

Figure 3:
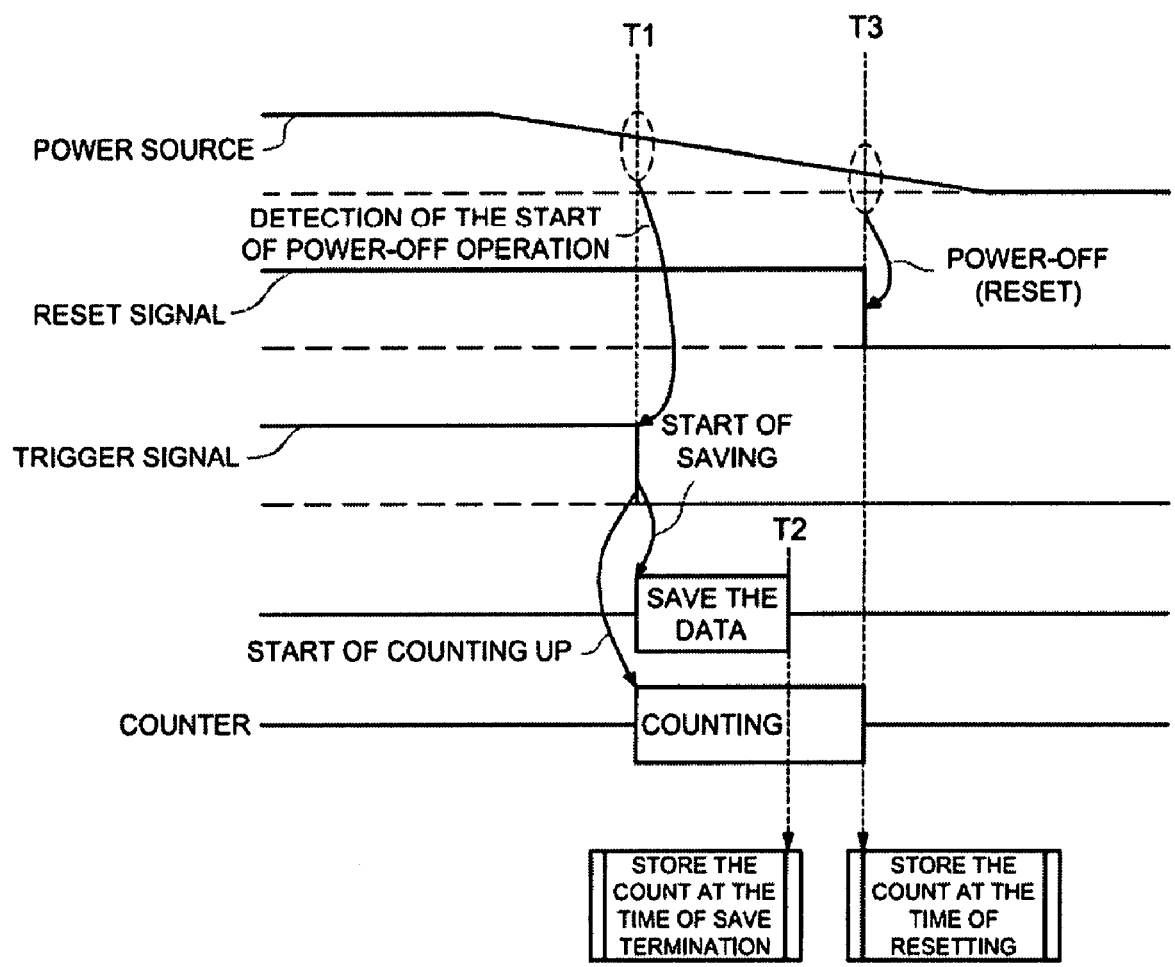
FIG. 3 is an explanatory diagram showing another example of the operation of saving the develop-save data (when a count is used)

FIG. 3 is an explanatory diagram showing the operation of saving the develop-save data when the count of the counter is used as the first timing information and second timing information. The power monitoring section circuit 28 outputs the trigger signal TS when the start of power-off operation has been detected (T1). The counter starts count-up operation upon detection of the trigger signal TS. Further, upon detection of the trigger signal TS, the processor 12 starts the process of saving the develop-save data of the system memory 15 in the nonvolatile memory 25 (SV).

Upon termination of the saving of the develop-save data (T2), the processor 12 reads the count at this time (first count) from the counter and ensures that this first count as the first timing information representing the develop-save data saving termination time point is written and stored in the nonvolatile memory 25. Upon detection of the reset signal RS from the power monitoring section circuit 28 (T3), the processor 12 reads the count (second count) at this time from the counter, and ensures that this second count as the second timing information representing the power-off time point is written and stored in the nonvolatile memory 25. The first count indicates the saving termination time point in terms of a time elapsed from when the power-off operation is detected, and the second count represents the power-off time point in terms of the time elapsed from when the power-off operation is detected.

At the time of the next power-on operation, the processor 12 reads the first count as the first timing information and the second count as the second timing information from the nonvolatile memory 25, and compares the first count as the saving termination time point with the second count representing the power-off time point. Based on the result of this comparison, the processor 12 determines the validity of the develop-save data saved in the nonvolatile memory 25 at the time of the previous power-off operation.

To put it in greater details, if the first count representing the saving termination time point is smaller than the second count representing the power-off time point, it is determined that the saving of the develop-save data has been correctly saved, and the develop-save data stored in the nonvolatile memory 25 is valid. By contrast, if the first count representing the saving termination time point is greater than the second count representing the power-off time point, the first count representing the saving termination time point is not stored in the nonvolatile memory 25 or although the second count representing the power-off time point is stored, saving of the develop-save data could not be performed in time. Accordingly, it is determined that the develop-save data stored in the nonvolatile memory 25 is not valid. In this example, if the value of the first counter is the same as that of the second counter, the procedure of handling is the same as that in the above-mentioned example.

As described above, the count of the saving termination time point of the develop-save data and the count of the time point of the occurrence of the reset signal RS (power-off time point) are stored in the nonvolatile memory 25, and they are read from the nonvolatile memory 25 and are compared at the time of the next power-on operation. This can also permits determination of the validity of the develop-save data, similarly to the case of storing the saving termination time point and power-off time point and comparing them, as shown in FIG. 2.

The following describes the procedure of changing the amount of the develop-save data at the time of the next power-off operation.

Figure 4:
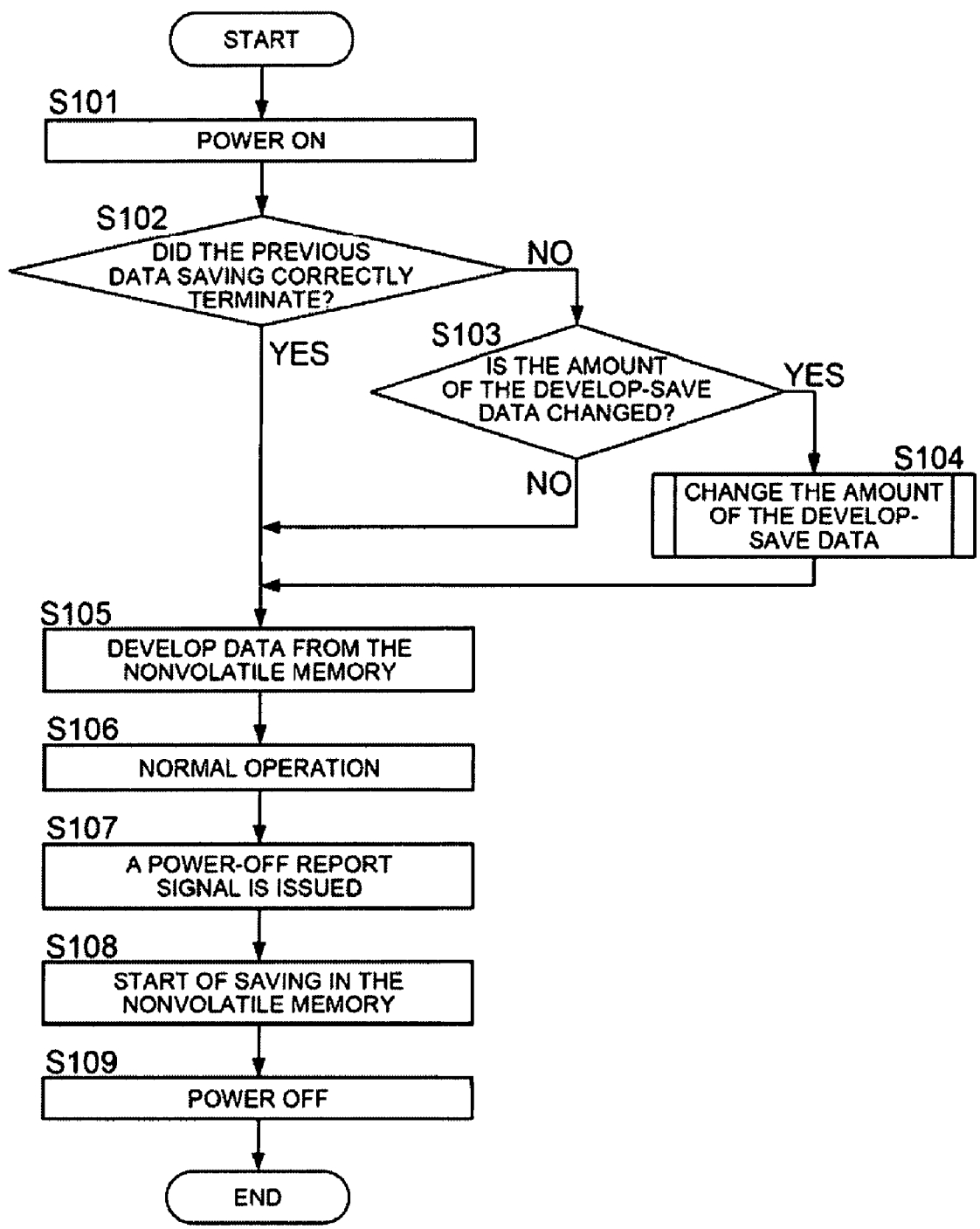
FIG. 4 is a drawing showing the overall procedure of the develop/save operation of the develop-save data of the image processing apparatus in the embodiment of the present invention.

FIG. 4 shows the overall operation of the image processing apparatus 10 with reference to the develop/save operation of the develop-save data. When the power is turned on (Step S101), the processor 12 reads the first timing information and second timing information from the nonvolatile memory 25 and compares them. The result of this comparison is used to determine the validity of the develop-save data having been saved in the nonvolatile memory 25 at the time of the previous power-off operation.

According to the result of this comparison, the processor 12 issues an alarm report. To be more specific, when power-off time point indicated by the second timing information comes before saving termination time point indicated by the first timing information, an alarm report is issued to notify that there is a problem with the validity of the develop-save data saved at the time of previous power-off operation. The alarm report can be given in terms of display of an alarm message on the LCD panel 14, or an alarm sound through a buzzer or speaker (not illustrated). The alarm report can also be supplied to the management personnel or service center through the network or communication line.

If there is a problem with the validity of the develop-save data according to the decision made when power is turned on (No in Step S102), a decision is made on whether the amount of the develop-save data should be changed (Step S103). For example, if, when powered on, there are three consecutive decisions that the validity is doubtful, a decision step is taken to change the amount of the develop-save data.

When a decision is made to change the amount of the develop-save data (Yes in Step S103), the processor 12 changes the amount of the develop-save data (Step S104), and develops the new amount of the develop-save data from the nonvolatile memory 25 to the system memory 15 (Step S105). In this process of changing, the setting is modified to reduce the amount of the develop-save data below the amount before the change.

If there is no problem with the validity of the develop-save data (Yes in Step S102) or a decision has been made that there is no need of changing the amount of the develop-save data (No in Step S103), the same develop-save data as the previous is read from the nonvolatile memory 25 and is developed in the system memory 15 (Step S105).

When the develop-save data has been developed in the system memory 15 in Step S105, the normal operation as the image processing apparatus 10 is performed (Step S106). After that, the start of the power-off operation is detected and the trigger signal TS is issued (Step S107). According to the procedures of FIGS. 2 and 3, the develop-save data is saved from the system memory 15 to the nonvolatile memory 25 (Step S108), and power is turned off (Step S109).

Figure 5:
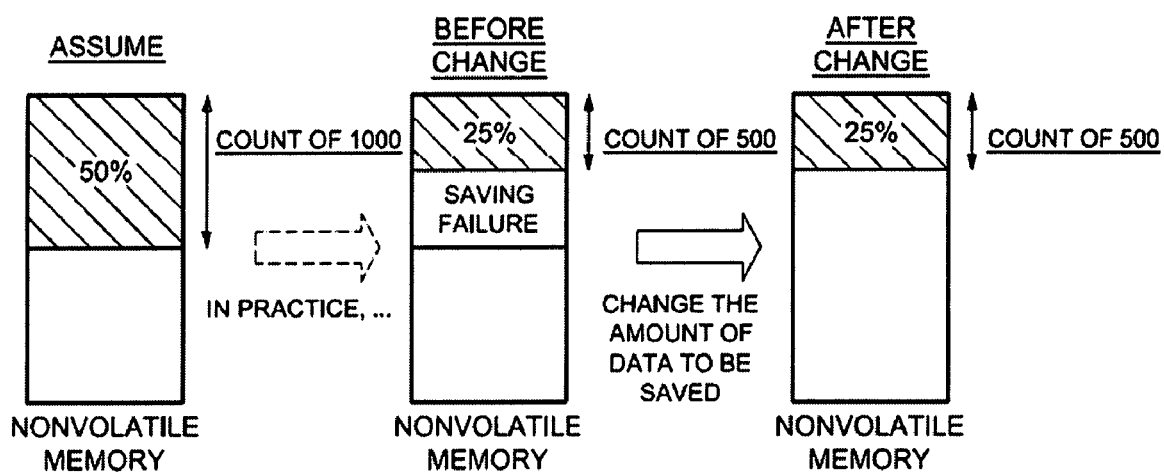
FIG. 5 is an explanatory diagram showing an example of reducing the amount of the develop-save data.

FIG. 5 shows an example of the operation of reducing the amount of the develop-save data in Step S104 of FIG. 4. In this example, the first timing information and second timing information are based on the count given as an example of FIG. 3. In the normal environment, a count of "1000" is assumed to save the develop-save data in the amount corresponding to 50% of the capacity of the nonvolatile memory 25. However, it is assumed that power conditions are poor and data saving failure occurs frequently so that the average count (second timing information) of the power-off time point stored in the nonvolatile memory 25 at that time is "500".

In this case, the time from detection of the start of power-off operation (output of the trigger signal TS) to the time of power-off operation (output of reset signal RS) is reduced to about 50% of the time assumed in the normal working environment. Thus, the amount of the develop-save data is reduced from 50% of the capacity of the nonvolatile memory 25 to 25% of it. This procedure solves the problem such that saving of the develop-save data is terminated completely when powered off, without being terminated incomplete in the middle.

The amount of data is reduced by removing the develop-save data of lower access frequency. The entire develop-save data is grouped according to function or operation mode, and the group developed from the nonvolatile memory 25 to the system memory 15 is switched in response to the state of using the operation mode or function of the image processing apparatus 10. For example, in the copying operation, only the develop-save data of the group for copying operation is developed from the nonvolatile memory 25 to the system memory 15, and this developed data is saved in the nonvolatile memory 25 upon termination of the copying operation. This arrangement reduces the amount of data to be saved in the nonvolatile memory 25 when the power has been turned off during the operation.

Change in the amount of the develop-save data by the processor 12 is implemented by modifying the number of pieces of develop-save data or the contents thereof, or by modifying the setting of whether or not the develop/save operation of the develop-save data is performed for each group.

Figure 6:
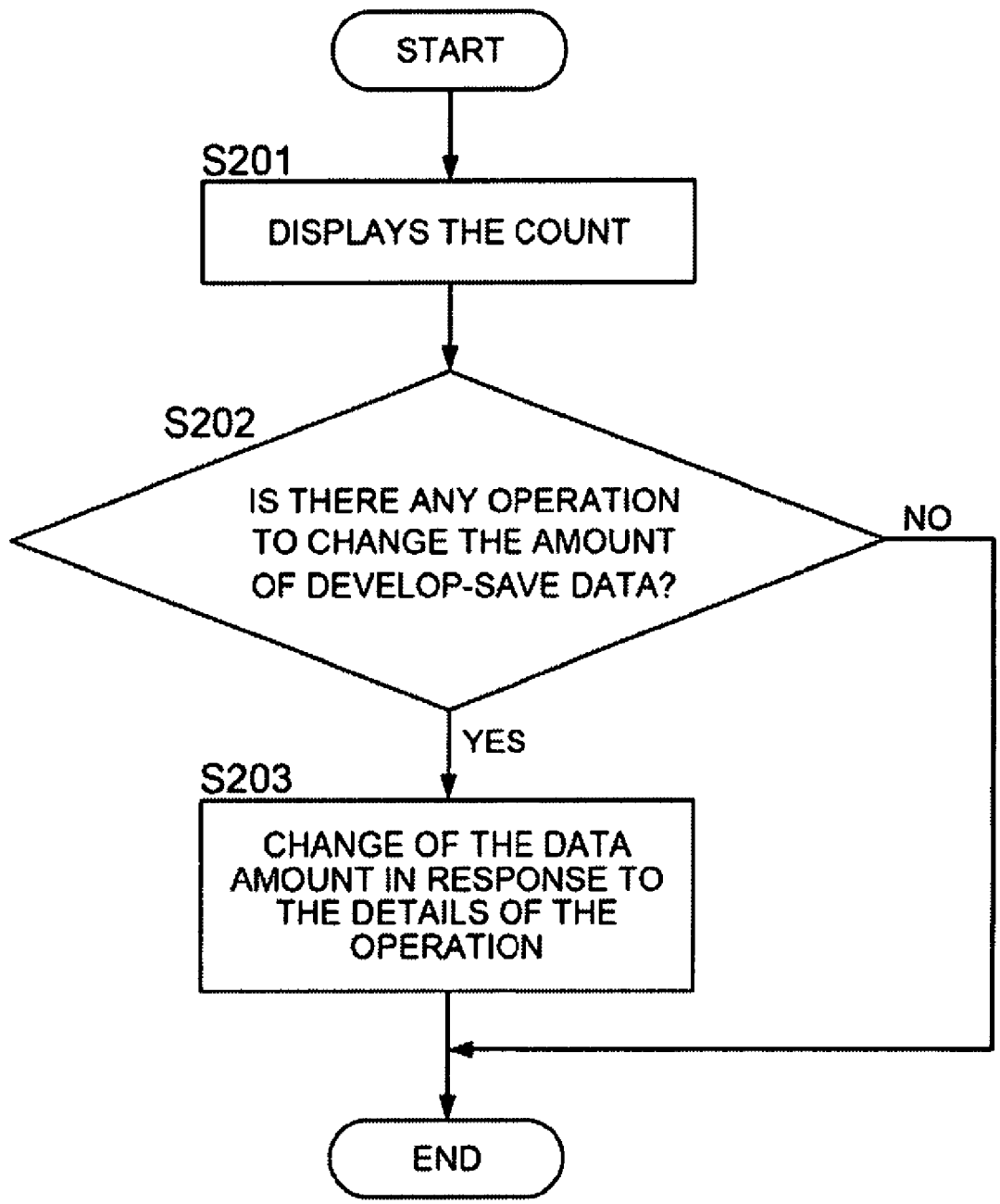
FIG. 6 is a flow diagram showing the flow in the process of changing the amount of develop-save data.
Figure 7:
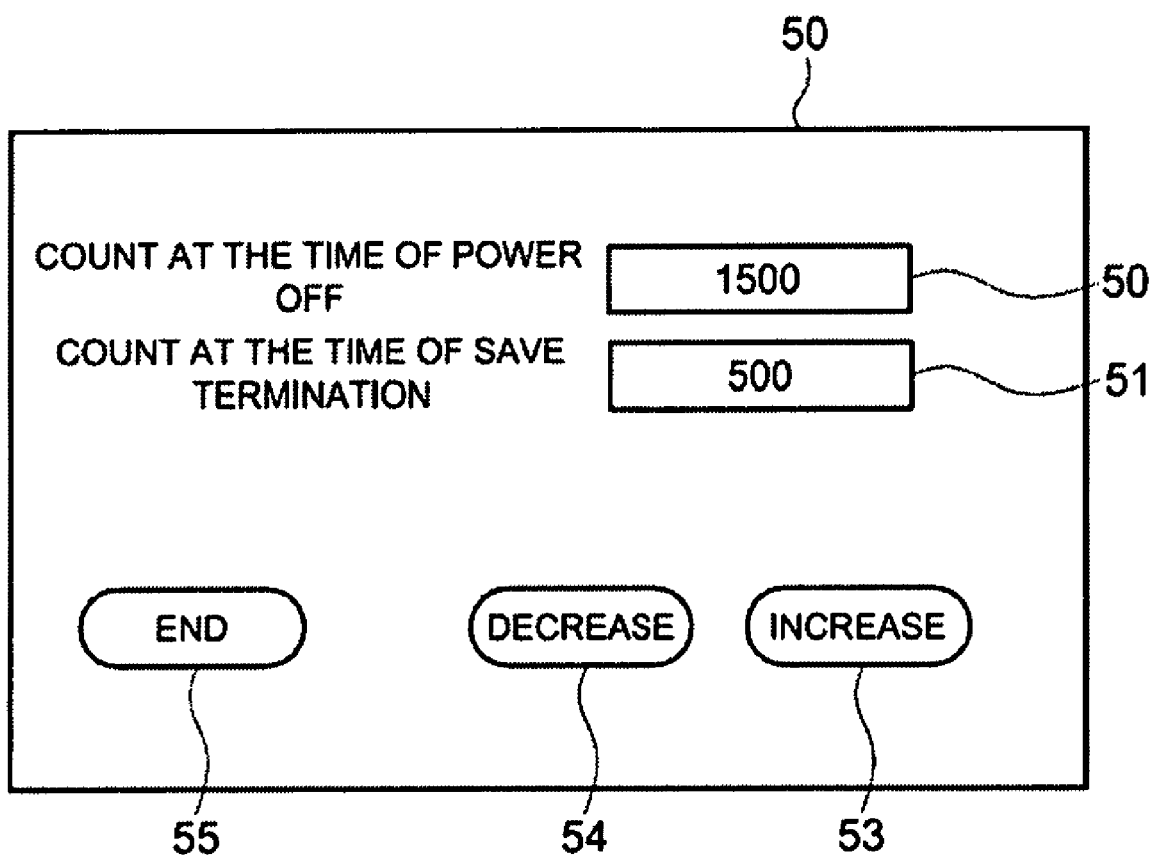
FIG. 7 is a front view showing an example of the operation screen to be implemented when the amount of data is changed.

The following describes the increase in the amount of the develop-save data:

The operation of increasing the amount of the develop-save data is performed in the serviceman mode which can be accessed by special operation and which cannot be accessed by a general user. FIG. 6 shows the flow of the procedure of changing the amount of the develop-save data in the serviceman mode, and FIG. 7 shows an example of the operation screen 50 that appears at the time of executing this processing. The processor 12 reads the values of the first timing information and second timing information stored in the nonvolatile memory 25, and displays them on the operation screen 50 (Step S201). In the example of FIG. 7, the first display column 51 indicates the count when powered off, while the second display column 52 shows the count at the termination of saving.

The service personnel refers to this display and determines whether or not the amount of the develop-save data is to be changed. If it is to be changed, the relevant operation is performed. In response to the operation of change by the service personnel (Yes in Step S202), the processor 12 changes the setting of the amount of the develop-save data according to this operation of change (Step S203). If the end button 55 has been operated without the operation of change (No in Step S202), processing terminates (End).

In the operation screen 50 of FIG. 7, when the increase button 53 has been operated, the amount of the develop-save data is increased. When the decrease button 54 has been operated, the amount of the develop-save data is decreased. Based on the first timing information and second timing information read from the nonvolatile memory 25, the processor 12 determine if the time from the saving termination time point to the power-off time point (lead time from the saving termination to power-off operation) exceeds the predetermined level or not. Only when this time exceeds the predetermined level, the increase button 53 is displayed. If this time is below the predetermined level, the increase button 53 disappears and the operation to increase the amount of data is disabled.

Figure 8:
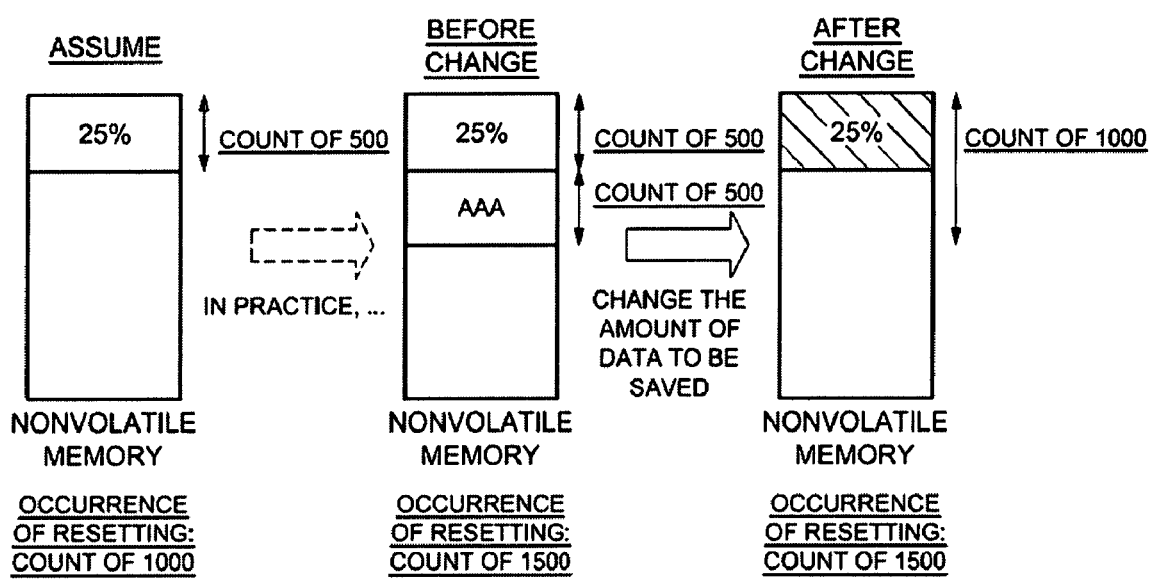
FIG. 8 is an explanatory diagram showing the mount of the develop-save data is increased.
Figure 9:
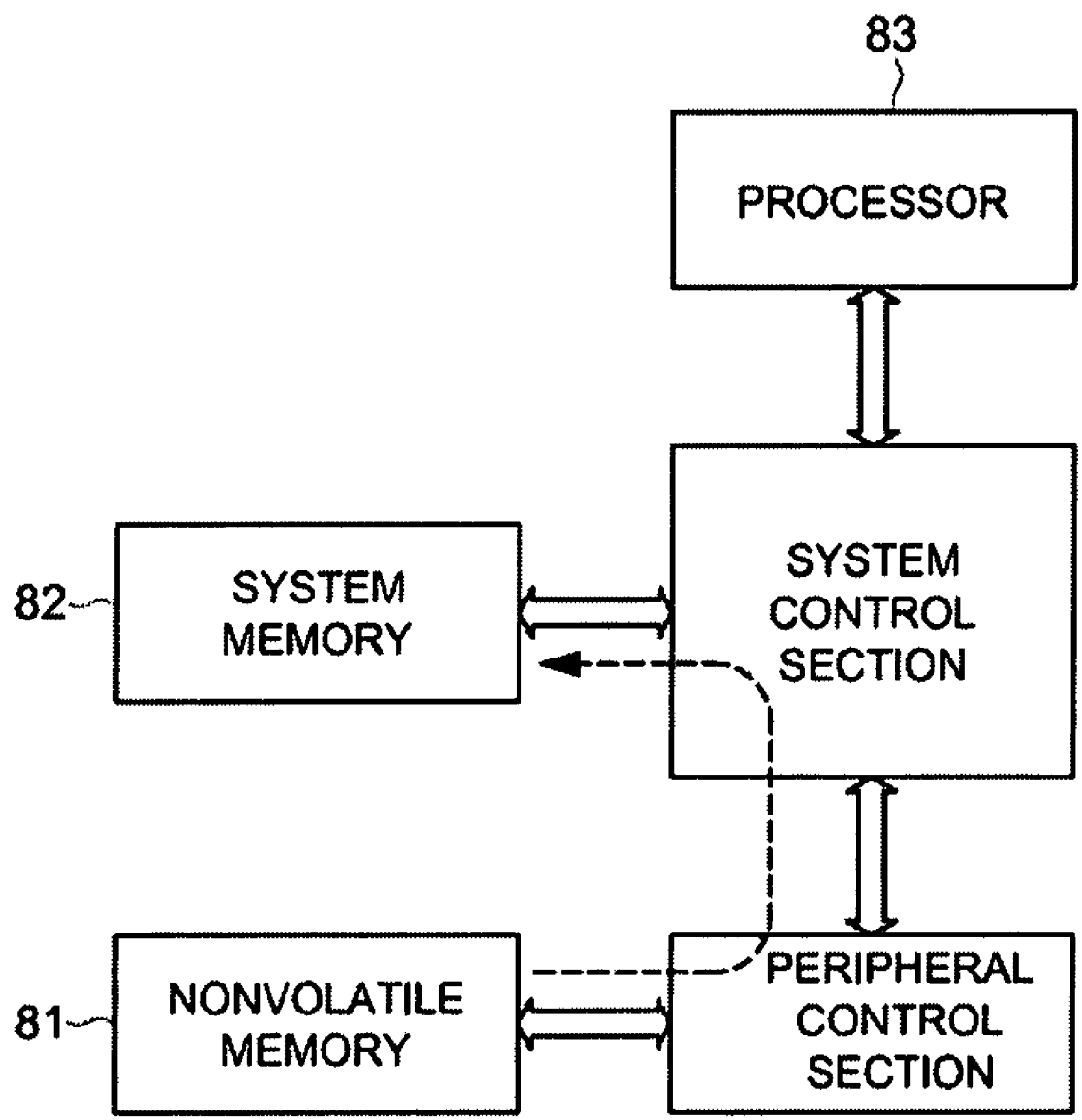
Figure 10:
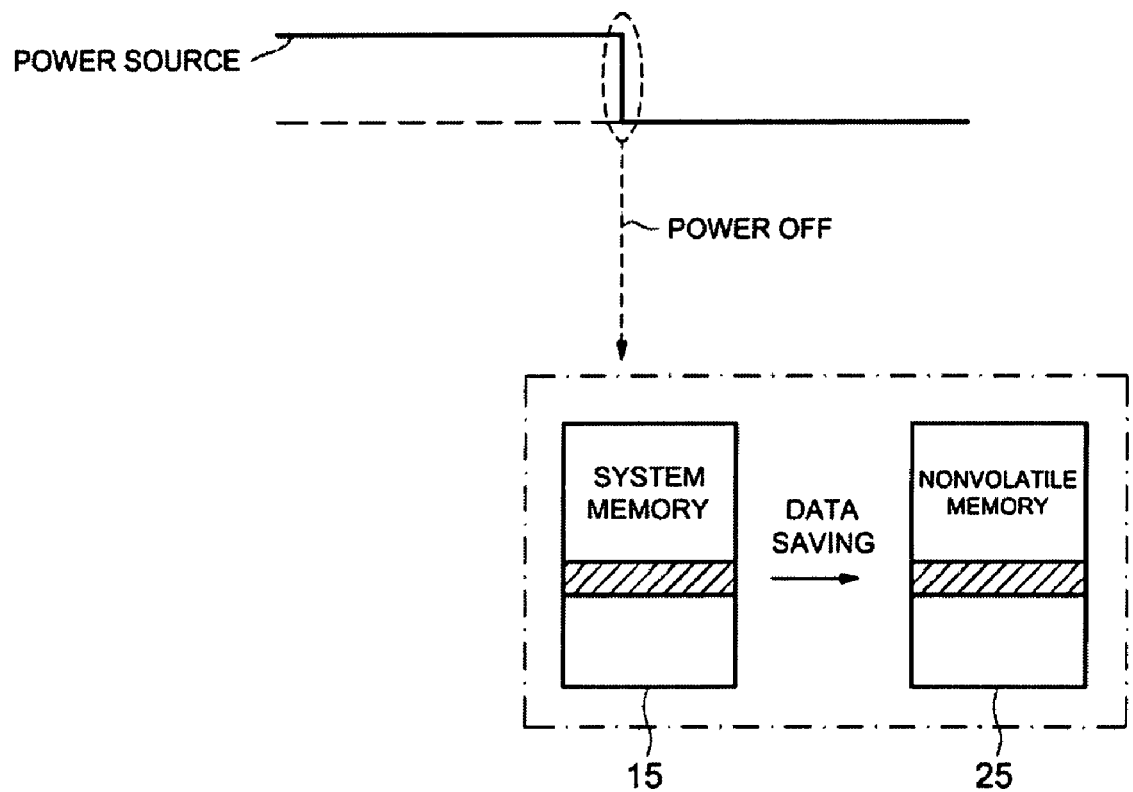
FIG. 10 is an explanatory diagram showing that data having been developed from the nonvolatile memory to the system memory when powered on is saved into the nonvolatile memory when powered off.
Figure 11:
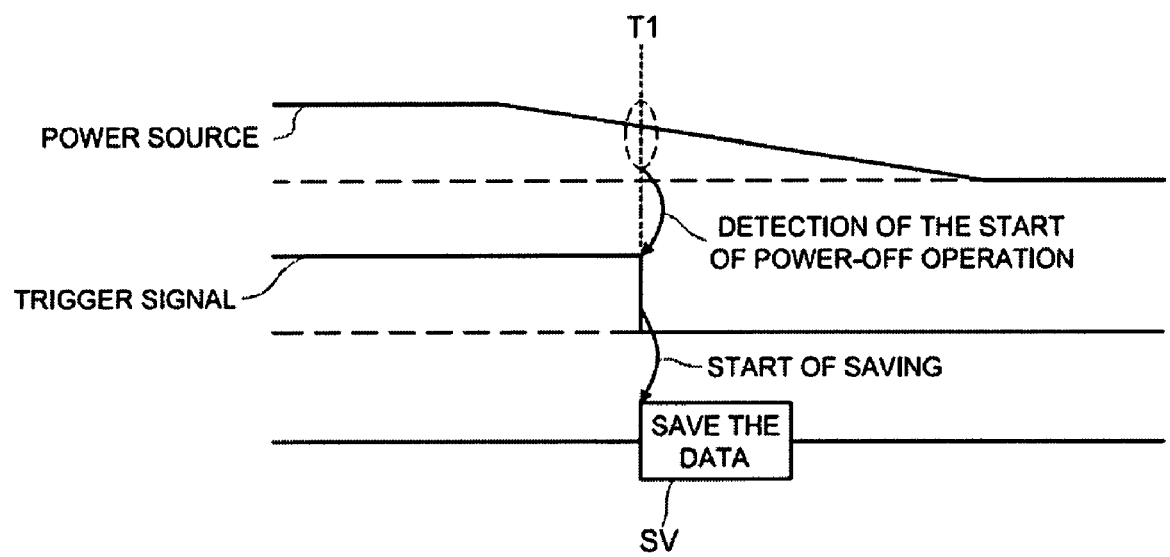
FIG. 11 is an explanatory diagram showing the data saving operation performed in a conventional apparatus when powered off.
Figure 12:
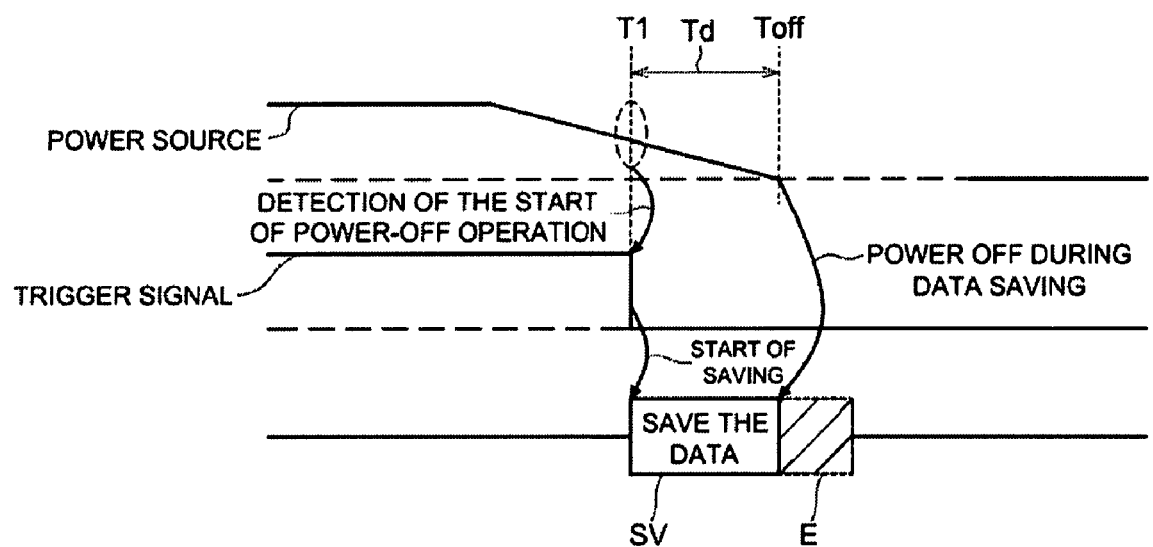
FIG. 12 is an explanatory diagram showing an example when the data saving operation is not performed in time in a conventional apparatus when powered off.

FIG. 8 shows an example of increasing the amount of the develop-save data. In this example, the first timing information and second timing information use the count in the example of FIG. 3. The standard count (second count) of "1000" at the power-off time point (time point for the occurrence of reset signal RS), in the normal environment is assumed, and the count of "500" therefrom is taken into account to ensure the margin of safety of the system. Thus, an assumption is made based on the case wherein the amount of develop-save data is set to the count of 500.

In this case, the power conditions in the environment of using the image processing apparatus 10 are favorable. Accordingly, when the actual count at the power-off time point is 1500, a lead time corresponding to a further count of 500 is available with respect to the design value. In such a case, the amount of the develop-save data is changed to increase from 25% of the capacity of the nonvolatile memory 25 to 50% of the capacity. This procedure increase the amount of data to be developed, and enhances the performance of the system operation. It also reduces the frequency of access to the nonvolatile memory 25, with the result that deterioration is prevented.

The embodiments of the present invention have been described with reference to drawings. It is to be expressly understood, however, that the specific structure of the present invention is not restricted thereto. The present invention can be embodied in a great number of variations with appropriate modification or additions, without departing from the technological spirit and scope of the invention claimed.

For example, in the embodiments, all the data having been developed from the nonvolatile memory 25 to the system memory 15 is saved when powered off. However, only the developed data that is rewritten during the operation can be determined as the object to be saved. In this case, the amount of the data to be saved should be changed in response to the result of comparison between the first timing information representing the saving termination time point and the second timing information representing the power-off time point.

Further, in the example of FIG. 4, whether the amount of the develop-save data is to be changed or not is automatically determined by the image processing apparatus 10 (Step S103). However, it is possible to make an arrangement so as to ask the operator to determine if the amount of data is to be reduced or not.

In the Steps S102 and S103 of FIG. 4, decision is made on the validity of the develop-save data and on whether the amount of data is to be reduced or not. In addition, it is also possible to make such arrangements that, in response to the result of comparison between the first timing information and second timing information, a decision is made on whether the amount of the develop-save data is increased or not. In response to the result of this decision, modification can be made to increase the amount of the develop-save data. In this modification, the amount of data can be automatically increased based on the result of decision, or it can be increased only according to the approval of the user having been requested to make this decision.

The amount of the develop-save data to be adjusted can be changed in response to the magnitude of the difference between the saving termination time point indicated by the first timing information and power-off time point represented by the second timing information, or can be adjusted uniformly independently of the magnitude of this difference.

The first timing information and second timing information is stored in the nonvolatile memory 25 by the processor 12. In addition, it is also possible to make such arrangements that it is stored by the circuit other than the processor 12, such as a peripheral control section 13. Further, the first timing information and second timing information can be stored in a memory or register other than the nonvolatile memory 25 for saving the develop-save data if they can be stored in the nonvolatile manner.

The embodiment has been described using an example of the image processing apparatus. However, this apparatus can be any information processing apparatus if it is possible to ensure that the predetermined data on the volatile memory is saved in the nonvolatile memory when powered off.

According to one aspect of the invention, a first timing information representing a time point of terminating the operation of saving the predetermined data in the nonvolatile memory and a second timing information representing a power-off time point, are stored, and are then compared with each other after the next power-on operation. In a case where the power-off time point represented by the second timing information is before the time point of terminating the operation of saving the predetermined data represented by the first timing information, or in a case where the first timing information is not stored, it is recognized that saving of the predetermined data has not terminated by the power-off time point. And in a case where the power-off time point represented by the second timing information is after the time point of terminating the operation of saving the predetermined data represented by the first timing information, it is recognized that the operation of saving the predetermined data has terminated and it is possible to recognize the possible time allowance from the termination of saving operation to the power-off operation According to another aspect of the present invention, a notice of warning showing that the operation of saving the predetermined data has not terminated by the power-off time point.

According to still another aspect of the present invention, it has been recognized from the result of comparison between the first timing information and second timing information that the saving of data has not terminated before the power-off time point, the setting is automatically changed in such a way that the amount of data to be saved in the nonvolatile memory will reduced.

According to further aspect of the present invention, even when the first timing information is not stored, the time duration from the detection of the power-off operation to the power-off time point can be identified from the second timing information. This makes it possible to estimate the amount of data that can be saved before the power-off operation. The time duration from the detection of the power-off can be identified, for example, according to the count of the counter wherein counting is started at the time of power-off detection.

What is claimed is:

1. An information processing apparatus comprising:
   a nonvolatile memory;
   a volatile system memory in which predetermined data stored in the nonvolatile memory is developed;
   a control section to save the predetermined data stored in the system memory in the nonvolatile memory when a start of power-off operation is detected; and
   a storage section that stores a first timing information representing a time point of terminating the operation of saving the predetermined data in the nonvolatile memory, and a second timing information representing a power-off time point,
   wherein the control section compares the first timing information stored in the storage section with the second timing information, subsequent to the next operation of turning on the power.

2. The information processing apparatus of claim 1, wherein the control section provides notice of warning in accordance with a result of the comparison of the first timing information with the second timing information.

3. The information processing apparatus of claim 2, wherein the control section provides notice of warning when the power-off time point indicated by the second timing information comes before the time point of terminating the operation of saving indicated by the first timing information.

4. The information processing apparatus of claim 1, wherein the control section changes an amount of data to be saved in the nonvolatile memory in accordance with a result of the comparison of the first timing information with the second timing information.

5. The information processing apparatus of claim 4, wherein the control section decreases an amount of data to be saved in the nonvolatile memory when the power-off time point indicated by the second timing information comes before the time point of terminating the operation of saving indicated by the first timing information.

6. The information processing apparatus of claim 1, wherein the control section accepts instruction to increase an amount of data to be saved in the nonvolatile memory only when the power-off time point indicated by the second timing information comes after the time point of terminating the operation of saving indicated by the first timing information.

7. The information processing apparatus of claim 1, wherein the first timing information is indicated by a time period from a time when the start of power-off operation is detected to the time point of terminating the operation of saving the predetermined data in the nonvolatile memory, and the second timing information is indicated by a time period from a time when the start of power-off operation is detected to the power-off time point.

8. The information processing apparatus of claim 1, wherein the control section includes a power monitoring section and the control section detects the start of power-off operation with the power monitoring section.

9. A method for saving data in a nonvolatile memory comprising:
saving predetermined data stored in a volatile memory in the nonvolatile memory when detecting a start of power-off operation;
storing a first timing information representing a time point of terminating the operation of saving the predetermined data in the nonvolatile memory, and a second timing information representing a power-off time point; and
comparing the stored first timing information with the stored second timing information, subsequent to the next operation of turning on of the power.

10. The method for saving data of claim 9, further comprising:
providing notice of warning in accordance with a result of the comparison of the first information with the second information.

11. The method for saving data of claim 10, further comprising: providing the notice of warning when the power-off time point indicated by the second timing information comes before the time point of terminating the operation of saving the predetermined data indicated by the first timing information.

12. The method for saving data of claim 9, wherein an amount of data to be saved in the nonvolatile memory is changed in accordance with a result of the comparison of the first timing information with the second timing information.

13. The method for saving data of claim 12, wherein the amount of data to be saved in the nonvolatile memory is decreased when the power-off time point indicated by the second timing information comes before the time point of terminating the operation of saving indicated by the first timing information.

14. The method for saving data of claim 9, further comprising:
accepting instruction to increase an amount of data to be saved in the nonvolatile memory only when the power-off time point indicated by the second timing information comes after the time point of terminating the operation of saving indicated by the first timing information.

15. The method for saving data of claim 9, wherein the first timing information is indicated by a time period from a time when the start of power-off operation is detected to the time point of terminating the operation of saving the predetermined data in the nonvolatile memory, and the second timing information is indicated by a time period from a time when the start of power-off operation is detected to the power-off time point.

* * * * *